United States Patent
Cittadini et al.

(10) Patent No.: US 6,776,950 B1
(45) Date of Patent: Aug. 17, 2004

(54) SLUSH-MOLDING METHOD FOR THE MANUFACTURE OF IMITATION LEATHERS, IN PARTICULAR FOR THE UPHOLSTERY OF CARS

(75) Inventors: Paolo Cittadini, Luvinate (IT); Vladimir Ignatov, Liguria (IT)

(73) Assignee: Industrie Ilpea S.p.A. (IT)

( * ) Notice: Subject to any disclaimer, the term of this patent is extended or adjusted under 35 U.S.C. 154(b) by 0 days.

(21) Appl. No.: 10/333,653
(22) PCT Filed: Jul. 24, 2000
(86) PCT No.: PCT/IT00/00310

§ 371 (c)(1),
(2), (4) Date: Jan. 21, 2003

(87) PCT Pub. No.: WO02/07946

PCT Pub. Date: Jan. 31, 2002

(51) Int. Cl.⁷ .......................... B29C 41/04; B29C 41/18
(52) U.S. Cl. ..................... 264/463; 264/494; 264/496; 264/302; 264/306; 264/308; 264/310
(58) Field of Search ................................ 264/405, 463, 264/494, 496, 302, 306, 307, 308, 309, 310, 115, 118; 425/134, 256, 425, 435

(56) References Cited

U.S. PATENT DOCUMENTS 4,814,119 A   3/1989   Scholz

FOREIGN PATENT DOCUMENTS

| BE | 09700409 | 2/1998 |
| EP | 0 476 742 A1 | 3/1992 |
| FR | 2 575 698 | 1/1985 |

*Primary Examiner*—Angela Ortiz
(74) *Attorney, Agent, or Firm*—James B. Conte; Barnes & Thornburg

(57) ABSTRACT

A slush-moulding method combined with cross-linking, including the filling of a tank with a suitable quantity of ground polymer blend and the coupling of said tank with a heated mold is provided. The closed system thus obtained is moved in order to transfer the powder onto the mold, so as to carry out on the latter a layer of completely or partially melted powder. Before and after a stage of stripping of the leather off the mold, said leather is cross-linked by means of radiations.

16 Claims, No Drawings

SLUSH-MOLDING METHOD FOR THE MANUFACTURE OF IMITATION LEATHERS, IN PARTICULAR FOR THE UPHOLSTERY OF CARS

The present invention relates to a slush-molding method for the manufacture of imitation leathers, in particular for the upholstery of cars.

As generally known, the slush-molding technology is broadly used for the manufacture of imitation leathers for the upholstery of cars, and in particular for the covering of dashboards and door panels. Said technology allows to obtain even highly three-dimensional imitation leathers easily and with low costs; moreover, slush molding gives the leather a leather design of excellent quality, and also allows to carry out even two-color leathers.

The slush-molding method is well known and reported in scientific literature, for instance in the following recent articles:

Pabst H. G., Shaper S., Schmidt R., Terveen A. (AUDI—VW Group)—VDI Conference—Mannheim 1988—"Development and large-scale use of dashboards produced by Slush Molding PVC"

Khue N. N., Kunper-Martz M., Dankmeier O., (EVC Group)—"Development of optimum powder blend for slush molding"—$4^{th}$ International Conference on PVC 1990—Apr. $24^{th}$–$26^{th}$ 1990, Brighton U.K. pp. 31/1–31/14.

The following patents also contain descriptions related to slush molding:

FR-A- 916.055, FR-A 1.131.153, FR-A 1.381.850, FR-A 1.560.675, U.S. Pat. No. B2,736,925, U.S. Pat. No. B3,039,146, GB-A-865.608, GB-A-1.025.493, GB-A-1.056.109, GB-A-1.337.962, DE-A-1.554.967, DE-A-3.417.727, IT-A-22197 A/80, EP-A-0 339 222, EP-A-0 476 742, and so on.

The aforesaid molding technology is based on a method including the following stages:

a) an open-air tank is first filled with a suitable polymer powder in a sufficient quantity and with grain sizes typically below 500 $\mu m$;

b) a mold, usually electroplated with nickel, is then heated to a given temperature;

c) the tank and the mold are then coupled in a closed system with suitable coupling means;

d) the system is moved so that the tank transfers the powder onto the mold, thus obtaining a uniform layer of partially or completely melted powder which adheres to said mold;

e) the closed system is then opened after being brought to the initial conditions again; at this stage the possible excess polymer powder deposits again into the tank and can thus be regenerated;

f) the mold can now be heated in order to complete the melting;

g) the mold is then cooled with suitable cooling means;

h) the formed leather is stripped off as a semi-finished product which can then be assembled with a support in order to obtain the finished product in the form of dashboard, door panels, and so on, for the upholstery of cars.

The greatest success recently obtained with imitation leathers for car dashboards has been reached by slush molding of PVC powders, with operations allowing to obtain even one- or multicolored leathers.

A problem which is still to be solved is how to obtain leathers by means of slush molding of materials other than PVC (polyvinyl chloride) with low costs, so as to avoid all the environmental and recycling problem arising from the use of a halogenated plastic material such as PVC.

PVC resins, suitably plasticized and having originally a sufficiently high molecular weight, when worked, gel and reach a minimum viscosity value allowing it to spread onto the mold without any shear efforts (typically desirable characteristic if the slush-molding technique is used), whereas the other plastic materials cannot combine a high molecular weight with such a low melt viscosity to give rise to the same phenomenon. As a matter of fact, high molecular weights, which would allow to obtain good performances as far as mechanical qualities and heat resistance are concerned, are also characterized by a very high melt viscosity, thus preventing the distribution and the spreading onto a mold without any shear effort.

On the other hand, the absence of shear efforts prevents the leather obtained by slush molding from having unwanted frozen inner stresses. Obviously, the possible presence of inner stresses would first reduce the resistance and non-deformability according to temperature. Moreover, leather in such conditions would show an increase of shrinkage in those critical situations of ageing which are required by car makers.

The use of techniques other than slush molding for the manufacture of leather result in the abovementioned disadvantages.

In particular, the kind of "hand" which can be obtained with the aforesaid slush-molding technique cannot be easily imitated with other techniques, such as plate thermoforming. Moreover, the kind of leather design, which is perfectly reproduced with slush molding and is not deformed as in thermoforming, cannot practically be obtained with other techniques. Within the same slush-molding technology various attempts have also been made to replace PVC with other materials.

For instance, thermosetting liquid polyurethanes are now sprayed onto a metal mold. Said materials are first particularly expensive with respect to PVC and THEREFORE make the process more expensive than the use of PVC. In addition, the products obtained by means of said materials have shown several faults, such as the presence of inhomogeneous leather shims and the imperfect compacting of leather resulting in a decrement of the mechanical performances of the product.

Moreover, the corner portions and the possible undercuts on the leather forming mold are typically concerned, during the deposit of liquid polyurethane, by areas with an excess filling of material, which causes further imperfections on the product and scraps.

Powdered thermoplastic polyurethanes (TPU) have also been used, but their cost is again very high and they are not well accepted since their recycling is difficult and they cause toxic decomposition products.

On the basis of the existing art, briefly described above, and of the disadvantages resulting from it, the preferable kinds of products in case PVC should be replaced, both for environmental and for economical reasons, are those made of polyolefins, which have long been focused on by technicians.

The problems arising from the use of polyolefin materials are different because of several reasons.

First of all, polyolefins show a low melting point (only homopolymer polypropylene, or polypropylene copolymerized with low amounts of comonomers, would be suitable, but it is often stiff and does not show a good resistance to ageing, to solvents, to abrasion and to scratching); their molecular weights are low because of that, and therefore, the materials offer a lower resistance to ageing.

Copolymerization further lowers their melting point, thus limiting the resistance to high temperatures which is required in specifications.

In case of thermoforming from calendered or extruded plates, the aforesaid disadvantages can be partially overcome, since the initial molecular weights are high, with all the advantages resulting from that as far as mechanical resistance, resistance to ageing and heat resistance, etc., are concerned.

To overcome the above problems are already know polyolefins cross-linking methods giving to the obtained semi-finished product a higher heat resistance. For instance, the Japanese published patent No. JP 01275640 describes a copolymer of alpha-olefin with butene-1 and other comonomers with the addition of peroxides, in order to obtain an expanded product which is resistant to high temperatures. This patent briefly mentions the possibility to obtain cross-linking with radiations.

Another Japanese published patent, No. JP 63069837, pursues the same aim as the previous one with an expansible composition containing organic peroxides, said composition being extruded without expansion and expanded after cross-linking, obtained with β-radiations (1 to 30 Mrad) with a cross-linking degree from 30 to 65% (gel fraction).

The Japanese patent JP 57197161 describes a laminated film of polyolefins or any kind of copolymers thereof (with vinyl acetate, octene, butene, etc.), said film having a high mechanical resistance, a high resistance to heat and a good weldability, cross-linked with doses from 1 to 10 Mrad (1 Mrad=10 kGy=$10^4$ J/kg) of X-rays, β-rays or γ-rays.

With the same aims as the previous patents, the patent JP 51092855 claims the use of triallylisocyanurates and 1,2-polybutadiene added to polyethylene in order to help cross-linking with low doses of radiations.

The Italian patent MI-A-000928 describes a half cross-linked film made of an ethylene/vinyl carboxylate copolymer (for instance EVA), which can be used as a surrogate of natural leather for coverings and other manufactured items, characterized in that it is cross-linked with doses of β-radiation from 30 to 70 kGy.

Said patent claims a half cross-linked film made of at least one ethylene/vinyl carboxylate copolymer, with 10–30% in weight of VC monomer (vinyl carboxylate), formed with a blow extrusion technique or flat-head extrusion without cross-linking, and then cross-linked with radiations having said intensity. Moreover, the EVA copolymer, the formulation which can be used, its use as imitation leather and the items manufactured from it are also claimed.

The systems of cross-linking with radiations which are used in known solutions have always been combined with plates or films, i.e. to substantially bidimensional manufactured items. Moreover, though improving the mechanical, ageing, etc. characteristics, the cross-linking obtained with known systems does not always meet the specification requirements of car industries. Other cross-linking techniques, mainly chemical, such as silanization, the use of peroxides, etc., show several problems, such as the need for environmental conditions of strong humidity and high temperatures for long times (silanes), the need for the oxidation of the materials during the process, etc. (peroxides), and the problem concerning the preparation of the initial compound, which reduce their possibilities of use in the specific field of slush molding.

The problem concerning the particular slush-molding process is therefore still unsolved, i.e. how to obtain manufactured items with high performances using polymers with a sufficiently low molecular weight, and therefore with suitable melt viscosity, said polymers preferably being ethylene polymers or copolymers mainly ethylene based.

The aforesaid general problem and the other problems which are typically related to the known technique are substantially overcome by the slush-molding process for the manufacture of imitation leather, in particular for the upholstery of cars, as described in the accompanying claims.

In greater detail, the process according to the invention substantially combines two essential phenomena; the cross-linking with radiations as the only means to increase the resistance of the manufactured article, in particular to high temperatures, and the radiation intensity, which is higher than the known technique (also above 100 kGy); according to the invention, moreover, the radiation, preferably a β-radiation, does not necessarily operate onto a flat film, but on slush-molded leathers which are already in the form of a finished part.

The need to use radiations with higher intensity results from the use of materials with very low molecular weights. According to the invention, the recovery of the necessary mechanical characteristics and of the characteristics of resistance to high temperatures is obtained after the slush-molding process with an application of β-rays above the one which is usually used on film material obtained by means of calendering or extrusion.

According to a preferred solution of the invention, the radiation can be used for the abovementioned purpose both when the leather still adheres to the mold after cooling, possibly on the manufacturing line, and after peeling said leather off the mold.

In the process according to the present invention it is possible to use all the polymers or copolymers which can be cross-linked by means of radiations and which are suitable for slush-molding techniques thanks to their characteristics of melt viscosity.

Said polymers are preferably olefin homo- and copolymers, and more preferably ethylene polymers or copolymers with a high content of ethylene.

Further characteristics and advantages will be more evident from the detailed description of some preferable non-limiting examples of embodiment of a slush-molding process for the manufacture of imitation leathers, in particular for the upholstery of cars, according to the present invention.

The slush-molding process for the manufacture of imitation leathers according to the invention requires that a suitable quantity of a polymer blend made of olefin-based homo- and copolymers is first prepared. Said blend is then reduced to a powder with reduced grain size.

Obviously, in case the intention is to manufacture with the present process a two-layer leather (visible compact layer plus inner expanded layer) or a two-color leather, it will be necessary to use a first and a second molecule, both provided with the necessary chemical, physical and/or chromatic characteristics.

Generally, the preparation of a slush-molding powder with a particle size almost always below 500 $\mu$m is carried out in this way:

First, with an extruder-granulator, a blend in grain form containing all the necessary ingredients is prepared; the grains thus obtained are ground, for instance in a cryogenic way (with liquid nitrogen) or alternatively with disc grinding (both at room temperature and at low temperature) in order to obtain the sieved powder, which is used directly for the slush-molding process.

It should be noted that, instead of grinding, it is possible to move on to micro-granulation directly during extrusion.

After the preparation of the polymer blend powder made of olefin-based homo- or copolymers, a sufficient quantity of said polymer powder is deposited into a tank.

At this time or during the filling of the tank, a forming mold is heated to a given temperature; it should be noted that the mold has the same shape as the dashboard, the door inside panel or any other component of the car interior which should be covered with leather during the manufacturing stage.

It should be noted that the mold is preferably electroplated with nickel, even if it can obviously be carried out in other ways without leaving the idea described in the present invention.

The tank containing a suitable quantity of polymer powder and the above described mold are then reciprocally coupled with suitable coupling means so as to define a closed system.

The closed system is then moved from an initial condition to a turned-over condition in which said tank transfers the powder onto the suitably heated mold by means of gravity, thus obtaining a uniform layer of completely or partially melted powder adhering to at least a portion of the shaping surface of said mold.

The closed system is then moved again and brought back to the initial conditions, so that the possible excess powder which has not adhered to the mold deposits again into the tank and can thus be regenerated.

The closed system can now be opened and the mold can possibly be re-heated in order to complete the melting; this stage can be not essential if the powder material has been suitably melted in the previous heating.

If a two-color manufactured item has to be produced, the first powder should be deposited onto a limited portion of the shaping surface of the mold, and after discharging the possible excess of first powder and coupling the mold with an auxiliary tank, an additional layer of a second powder, chromatically different from the first one, should be deposited.

The second layer will cover the remaining portion of the shaping surface, thus giving rise to a leather which, at least on the visible side, will be two-colored.

If, alternatively, a two-layer leather has to be manufactured, a first powder defining a compact layer on the visible side should be deposited, followed by a second powder defining an expanded inner layer.

In any case, the following stages of the process include the mold cooling by suitable cooling means and the stripping-off of the formed leather as a semi-finished product which can be assembled, for instance, with a support so as to obtain the finished product in the form of a dashboard, door panel, etc., for the upholstery of cars.

According to the invention, before stripping the leather off the mold or, alternatively, after said stripping-off, said leather is cross-linked with radiations, preferably including a β-radiation.

Obviously, if a two-layer manufactured item has to be carried out (both layers being compact, possibly with different colors, or a compact layer and a following inner expanded layer), the slush-molding process will be executed twice with a final cross-linking with β-rays which can involve both layers.

In particular, the β-radiation having the necessary cross-linking effect has proved to be the one whose intensity is between 20 and 300 kGy.

More precisely, the cross-linking effects which are necessary to ensure good performances of the manufactured item have been obtained by means of β-radiations with intensities above 70 kGy.

Always according to the invention, it has been surprisingly noted that the polymers which have proved ideal for the production of manufactured items with the described process are made of blends, mainly polyolefin blends, with a melt viscosity value corresponding to a MFI (Melt Flow Index) at 190° C. and under a load of 2,16 kg above 10 g/10 minutes. More precisely, said polymers are preferably olefin homo- and copolymers, and more preferably ethylene polymer or copolymers with a high content of ethylene.

EXAMPLE 1

An ethylene-octene copolymer designated as "ENGAGE 8401", produced by DouPont Dow Elastomers, bought in grains, was used.

Among additives, carbon black was added in percentages between 0,2% and 2%, together with commercial antioxidants and UV absorbers in order to ensure a better resistance of the material to light and heat.

In order to help the peeling of the leather, inner peeling agents can be added, such as silicon peeling agents or waxes or lithium/calcium/magnesium stearates/laureates. The MFI of the copolymer measured at 180° C. and under a load of 2,16 kg is 25 g/min.

The molecule is then reduced to a powder by grinding it until a grain diameter below 500 μm is reached.

By means of the abovementioned mixture a semifinished product was obtained with the slush-molding technique previously described.

Said product then underwent cross-linking by means of β-rays having a radiation intensity of 80 kGy.

The cross-linking degree reached was 55%.

EXAMPLE 2

In a parallel a say carried out with the same materials and conditions as the previous assay, changing only the radiation intensity, brought to 120 kGy, the cross-linking degree was 66%.

The table below provides by way of example some data referring to the assays before cross-linking, after cross-linking and after ageing in oven at 130° C. for 240 h.

| | | After cross-linking | |
|---|---|---|---|
| Example | Cross-linking degree | Breaking load MPa | Hardness ShA |
| Untreated Engage 8401 | 0 | 8.5 | 78 |
| Engage 8401 Radiation: 80 kGy | 55 | 11 | 76 |
| Engage 8401 Radiation: 120 kGy | 66 | 12 | 75 |

| | | After cross-linking at 130° C. 240 h | |
|---|---|---|---|
| Example | Cross-linking degree | Breaking load MPa | Hardness ShA |
| Untreated Engage 8401 | 0 | Loss of structural characteristics | |
| Engage 8401 Radiation: 80 kGy | 55 | 10 | 76 |
| Engage 8401 Radiation: 120 kGy | 66 | 9 | 79 |

These data show that the semifinished product, after undergoing the cross-linking process, shows an increment of the breaking load. This value moves from 8,5 MPa of the non cross-linked material to 11 MPa, if the cross-linking degree is 55%. If, on the other hand, the cross-linking degree is 66%, this value reaches 12 MPa.

Even after the ageing process at 130° C., the values of breaking load are 10 MPa (cross-linking 55%) and 9 MPa (cross-linking 66%).

Hardness keeps within ranges of small variation, with values between 75 and 79 ShA.

EXAMPLE 3

The starting material is now a blend of an ethylene/vinyl acetate copolymer (EVA), in which the weight percentage of vinyl acetate is 28%, with low-density polyethylene (PE) in a 80:20 ratio.

The MFI (melt flow index) of the copolymer measured at 190° C. and under a load of 2,16 kg is 20 g/10 min.

The blend before grinding is further added with pigments (carbon black), peeling agents, antioxidants, UV absorbers and cross-linking accelerators.

The blend is then reduced to powder.

After manufacturing the semifinished product with the slush-molding technique using said mixture, said semi-finished product undergoes cross-linking by means of β-radiation.

The assays with β-radiation having an intensity of 80 kGy allowed to obtain a cross-linking degree of 65%.

On the other hand, the assays with β-radiation having an intensity of 120 kGy showed a cross-linking degree of 75%.

The table below provides by way of example some data referring to the assays with the blend of ethylene/vinyl acetate copolymer and low-density polyethylene.

|  |  | After cross-linking | |
| --- | --- | --- | --- |
| Example | Cross-linking degree | Breaking load MPa | Hardness ShA |
| Untreated EVA + PE | 0 | 5 | 69 |
| EVA + PE Radiation: 80 kGy | 65 | 7 | 72 |
| EVA + PE Radiation: 120 kGy | 75 | 9 | 75 |

|  |  | After cross-linking at 130° C. 240 h | |
| --- | --- | --- | --- |
| Example | Cross-linking degree | Breaking load MPa | Hardness ShA |
| Untreated EVA + PE | 0 | Loss of structural characteristics | |
| EVA + PE Radiation: 80 kGy | 65 | 6 | 74 |
| EVA + PE Radiation: 120 kGy | 75 | 8 | 77 |

What is claimed is:

1. A slush-moulding method combined with the cross-linking including the following steps:
   preparing of a suitable quantity of at least a first polymer blend;
   grinding or micro granulating said first blend in order to obtain a powder;
   charging into at least a tank of a sufficient quantity of polymer powder;
   heating a mould to a given temperature;
   coupling said tank with said mould with suitable coupling means;
   moving the reciprocally coupled tank and mould from an initial condition to a turned-over condition in which the tank transfer at least part of the powder into the mould, thus obtaining a layer of completely or partially melted powder adhering to at least a portion of the shaping surface of the mould;
   further possible heating in order to complete the melting;
   cooling the mould so as to obtain a semi-finished product as a film;
   stripping-off the semi-finished product as a film, wherein before or after the stripping-off step, the semi finished product as a film is cross-linked by means of a radiation having an intensity between 70 and 300 kGv in order to obtain a covering letter.

2. A slush-moulding method combined with the cross-linking including the following steps:
   preparing a suitable quantity of at least a first polymer blend;
   grinding or micro granulating said first blend in order to obtain a powder;
   charging into at least a tank of sufficient quantity of polymer powder;
   heating a mould to be given temperature;
   coupling said tank with said mould with suitable coupling means;
   moving the reciprocally coupled tank and mould from an initial condition to a turned-over condition in which the tank transfer at least part of the powder into the mould thus obtaining a layer of completely or partially melted powder adhering to at least a portion of the shaping surface of the mould;
   further possible heating in order to complete the melting;
   cooling the mould so as to obtain a semi-finished product as a film;
   stripping off the semi finished product as a film, wherein, before or after the stripping-off step, the semi-finished product as a film is cross-linked by means of a β radiation in order to obtain a covering leather.

3. A method according to claim 1, wherein said polymer blend contains olefin-based homo-or copolymers.

4. A method according to claim 1, wherein the blend is mainly polyolefin-based, with a value of melt viscosity corresponding to a MFI (Melt Flow Index) at 190° C and under a load of 2,16 Kg above 10 g/10 minutes.

5. A method according to claim 4, characterized in that said polymers are preferably olefin homo- or co-polymers, and more preferably ethylene polymers or co-polymer with a high content of ethylene.

6. A method according to claim 1, wherein cross-linking takes place before stripping the leather off the mould.

7. A method according to claim 1, characterized in that wherein the cross linking takes place after the stripping of the semi-finished products as a film off the mould.

8. A method according to claim 4, wherein the blend, mainly polyolefin-based, contains an ethylene/vinyl acetate copolymer.

9. A method according to claim 4, wherein the blend, mainly polyolefin-based, contains an ethylene/octene copolymer.

10. A method according to claim 1, wherein after said moving step before said stripping-off, the reciprocally coupled mould and the tank are brought back to the initial condition so as to determine the discharge of the excess powder from the mould towards the tank.

11. A method according to claim 1, wherein the preparation, grinding or micro granulation, deposition, heating, coupling, moving and cooling are carried out one after the other.

12. A method to claim 1, wherein before the cooling step the following steps are carried out:

disengagement of the mould from said tank;

coupling of the mould with an auxiliary tank housing a given quantity of a powder of a second polymer blend;

moving of the auxiliary tank and of the mould reciprocally coupled from an initial condition to a turned-over condition in which the auxiliary tank transfers at least part of the second powder into the mould, thus obtaining a layer of completely or partially melted powder into the mould, thus obtaining a layer of completely or partially melted powder which at least partially overlaps the previously deposited layer.

13. A method according to claim 12, wherein the powder of the second polymer blend shows a higher expansibility than the polymer powder previously deposited.

14. A method according to claim 12, wherein the layer of first powder adhering to the mold covers a portion of the shaping surface of said mold, said layer being obtained with the second powder covering at least the remaining portion of the shaping surface of the mold.

15. A method according to claim 14, wherein the layer obtained with the second powder is chromatically different from the layer obtained with the first powder, thus obtaining leathers with different colors.

16. A method according to claim 1, wherein said mould shows a three-dimensional shaping surface for a leather also having a three-dimensional development.

* * * * *